(12) United States Patent
Lee et al.

(10) Patent No.: US 11,528,740 B2
(45) Date of Patent: Dec. 13, 2022

(54) METHOD AND BASE STATION FOR TRANSMITTING DOWNLINK CONTROL INFORMATION, AND USER EQUIPMENT, APPARATUS, AND STORAGE MEDIUM FOR RECEIVING DOWNLINK CONTROL INFORMATION

(71) Applicant: LG ELECTRONICS INC., Seoul (KR)

(72) Inventors: Hyunho Lee, Seoul (KR); Duckhyun Bae, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/734,735

(22) Filed: May 2, 2022

(65) Prior Publication Data
US 2022/0295531 A1    Sep. 15, 2022

Related U.S. Application Data

(63) Continuation of application No. PCT/KR2020/004315, filed on Mar. 30, 2020.

(60) Provisional application No. 62/938,339, filed on Nov. 21, 2019, provisional application No. 62/938,813, filed on Nov. 21, 2019.

(51) Int. Cl.
    *H04W 72/12*    (2009.01)
    *H04L 5/00*     (2006.01)

(52) U.S. Cl.
    CPC ....... *H04W 72/1289* (2013.01); *H04L 5/0092* (2013.01)

(58) Field of Classification Search
    CPC .................. H04L 5/0092; H04W 72/1289
    USPC .................................................... 370/330
    See application file for complete search history.

(56) References Cited

U.S. PATENT DOCUMENTS

| | | | |
|---|---|---|---|
| 2014/0206362 A1 | 7/2014 | Xu et al. | |
| 2020/0228970 A1* | 7/2020 | Noh | H04W 72/048 |
| 2020/0351955 A1* | 11/2020 | Jeon | H04L 5/0053 |
| 2021/0105809 A1* | 4/2021 | Park | H04L 27/2602 |
| 2022/0240301 A1* | 7/2022 | Bagheri | H04W 72/0413 |

OTHER PUBLICATIONS

PCT International Application No. PCT/KR2020/004315, International Search Report dated Aug. 11, 2020, 3 pages.
Huawei, "Summary of 7.2.6.1 PDCCH enhancements," R1-1913267, 3GPP TSG RAN WG1 Meeting #99, Nov. 2019, 62 pages.

(Continued)

*Primary Examiner* — Peter G Solinsky
(74) *Attorney, Agent, or Firm* — Lee, Hong, Degerman, Kang & Waimey PC

(57) ABSTRACT

A base station and a user equipment may determine whether to determine a start symbol value representing a start symbol of a physical downlink shared channel (PDSCH) on the basis of a reference point which is different from the start of a slot allocated for the PDSCH of a cell and is based on the subcarrier spacing of the cell and the subcarrier spacing of a scheduling cell for the cell. The base station/user equipment may transmit/receive, through the scheduling cell, the DCI including symbol information on the start symbol value for the PDSCH on the basis of the determination.

17 Claims, 12 Drawing Sheets

(56) References Cited

OTHER PUBLICATIONS

NTT DOCOMO, Inc., "PDCCH enhancements for URLLC," R1-1912885, 3GPP TSG RAN WG1 #99, Nov. 2019, 14 pages.
ZTE, "On PDCCH enhancements for NR URLLC," R1-1911963, 3GPP TSG RAN WG1 #99, Nov. 2019, 17 pages.
CATT, "PDCCH enhancements for URLLC," R1-1912168, 3GPP TSG RAN WG1 Meeting #99, Nov. 2019, 13 pages.

\* cited by examiner

METHOD AND BASE STATION FOR TRANSMITTING DOWNLINK CONTROL INFORMATION, AND USER EQUIPMENT, APPARATUS, AND STORAGE MEDIUM FOR RECEIVING DOWNLINK CONTROL INFORMATION

CROSS-REFERENCE TO RELATED APPLICATIONS

This application is a continuation of International Application No. PCT/KR2020/004315, filed on Mar. 30, 2020, which claims the benefit of U.S. Provisional Patent Application Nos. 62/938,339, filed on Nov. 21, 2019, and 62/938,813 filed on Nov. 21, 2019, the contents of which are all hereby incorporated by reference herein in their entireties.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Task

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solutions

According to one aspect the present disclosure, a method for transmitting downlink control information (DCI) by a base station in a wireless communication system is provided. The method includes, based on a subcarrier spacing of a cell and a subcarrier spacing of a scheduling cell for the cell, determining whether to determine a start symbol value representing a start symbol of a physical downlink shared channel (PDSCH) of the cell based on a reference point different from the start of a slot allocated for the PDSCH, and transmitting the DCI including symbol information on the start symbol value for the PDSCH through the scheduling cell based on the determination.

According to one aspect the present disclosure, a base station transmitting downlink control information (DCI) in a wireless communication system is provided. The base station includes at least one transceiver, at least one processor, and at least one computer memory operably connectable to the at least one processor and storing instructions that, when executed, cause the at least one processor to perform operations. The operations include, based on a subcarrier spacing of a cell and a subcarrier spacing of a scheduling cell for the cell, determining whether to determine a start symbol value representing a start symbol of a physical downlink shared channel (PDSCH) of the cell based on a reference point different from the start of a slot allocated for the PDSCH, and transmitting the DCI including symbol information on the start symbol value for the PDSCH through the scheduling cell based on the determination.

In each aspect of the present disclosure, the determining of the starting symbol value based on the reference point may include determining the start symbol value for the PDSCH based on the reference point based on the subcarrier spacing of the cell being equal to the subcarrier spacing of the scheduling cell.

In each aspect of the present disclosure, the determining of the starting symbol value based on the reference point may include transmitting information indicating application of the reference point based on the subcarrier spacing of the cell being equal to the subcarrier spacing of the scheduling cell.

In each aspect of the present disclosure, the reference point may be the start of a physical uplink control channel (PDCCH) monitoring occasion in which the DCI is transmitted.

In each aspect of the present disclosure, the determining of whether to determine the start symbol value based on the reference point may be performed only for DCI format 1_2.

In each aspect of the present disclosure, the symbol information may be time domain resource allocation information about a slot and length indicator value (SLIV) representing a start symbol and the number of symbols.

In each aspect of the present disclosure, the determining of the starting symbol value based on the reference point may include determining the start symbol value for the PDSCH based on the start of the slot allocated for the PDSCH based on the subcarrier spacing of the cell being less than the subcarrier spacing of the scheduling cell.

In each aspect of the present disclosure, the operations may include transmitting information indicating application of the reference point based on the subcarrier spacing of the cell being less than the subcarrier spacing of the scheduling cell.

According to another aspect of the present disclosure, a method for receiving downlink control information (DCI) by a UE in a wireless communication system is provided. The method includes receiving the DCI including symbol information on a start symbol value representing a start symbol of a physical downlink shared channel (PDSCH) of a cell on a scheduling cell for the cell, determining whether to apply the start symbol value based on a reference point different from the start of a slot allocated for the PDSCH based on a subcarrier spacing of the cell and a subcarrier spacing of the scheduling cell, and determining the start symbol of the PDSCH based on the determination and the start symbol value.

According to another aspect of the present disclosure, a UE receiving downlink control information (DCI) in a wireless communication system is provided. The UE includes at least one transceiver, at least one processor, and at least one computer memory operably connectable to the at least one processor and storing instructions that, when executed, cause the at least one processor to perform operations. The operations include receiving the DCI including symbol information on a start symbol value representing a start symbol of a physical downlink shared channel (PDSCH) of a cell on a scheduling cell for the cell, determining whether to apply the start symbol value based on a reference point different from the start of a slot allocated for the PDSCH based on a subcarrier spacing of the cell and a subcarrier spacing of the scheduling cell, and determining the start symbol of the PDSCH based on the determination and the start symbol value.

According to another aspect of the present disclosure, an apparatus for a UE is provided. The apparatus includes at least one processor and at least one computer memory operably connectable to the at least one processor and storing instructions that, when executed, cause the at least one processor to perform operations. The operations include receiving downlink control information (DCI) including symbol information on a start symbol value representing a start symbol of a physical downlink shared channel (PDSCH) of a cell on a scheduling cell for the cell, determining whether to apply the start symbol value based on a reference point different from the start of a slot allocated for the PDSCH based on a subcarrier spacing of the cell and a subcarrier spacing of the scheduling cell, and determining the start symbol of the PDSCH based on the determination and the start symbol value.

According to another aspect of the present disclosure, a computer readable storage medium is provided. The computer readable storage medium stores at least one computer program including instructions that, when executed by at least one processor, cause the at least one processor to perform operations for a UE. The operations include receiving downlink control information (DCI) including symbol information on a start symbol value representing a start symbol of a physical downlink shared channel (PDSCH) of a cell on a scheduling cell for the cell, determining whether to apply the start symbol value based on a reference point different from the start of a slot allocated for the PDSCH based on a subcarrier spacing of the cell and a subcarrier spacing of the scheduling cell, and determining the start symbol of the PDSCH based on the determination and the start symbol value.

In each aspect of the present disclosure, determining of whether to apply the start symbol value based on the reference point may include applying the symbol information based on the reference point based on the subcarrier spacing of the cell being equal to the subcarrier spacing of the scheduling cell, In each aspect of the present disclosure, determining of whether to apply the start symbol value based on the reference point may include further receiving informing indicating application of the reference point based on the subcarrier spacing of the cell being equal to the subcarrier spacing of the scheduling cell.

In each aspect of the present disclosure, the reference point may be the start of a physical uplink control channel (PDCCH) monitoring occasion in which the DCI is transmitted.

In each aspect of the present disclosure, the determining of whether to determine the start symbol value based on the reference point may be performed only for DCI format 1_2.

In each aspect of the present disclosure, determining of the start symbol of the PDSCH may include applying the start symbol value based on the start of the slot allocated for the PDSCH based on the subcarrier spacing of the cell being less than the subcarrier spacing of the scheduling cell.

In each aspect of the present disclosure, the operations may include not receiving information indicating application of the reference point based on the subcarrier spacing of the cell being less than the subcarrier spacing of the scheduling cell.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

BEST MODE FOR DISCLOSURE

Figure 1:
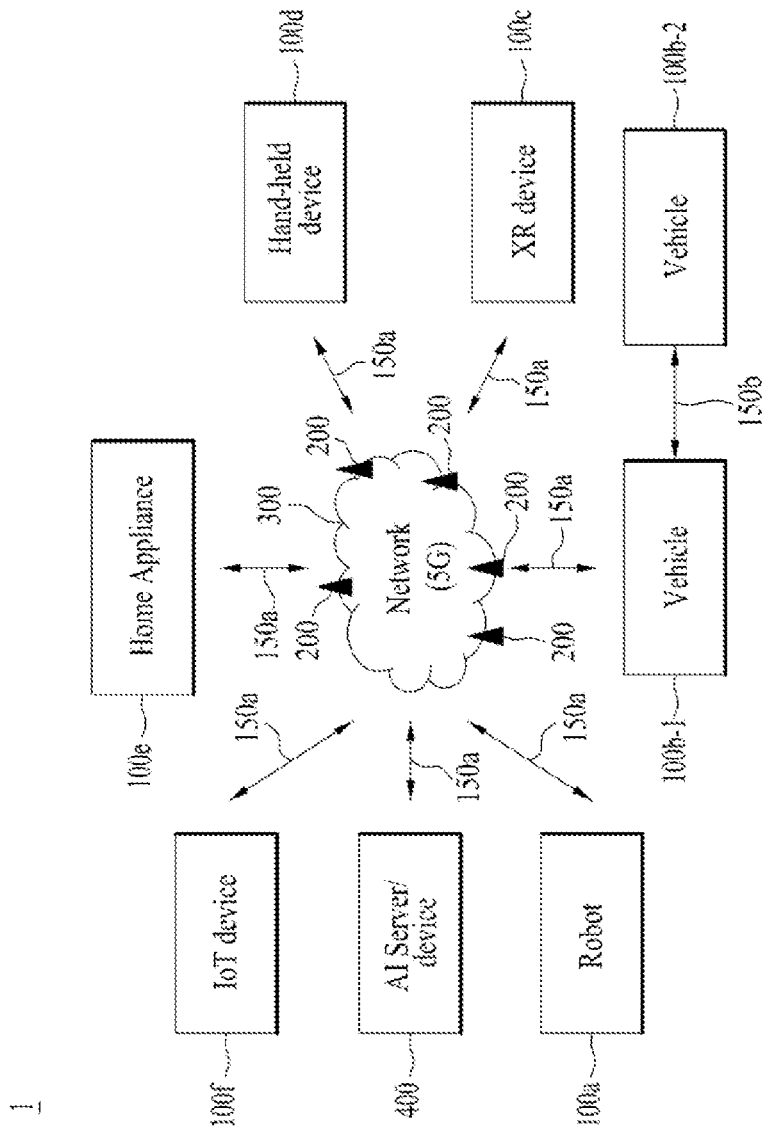
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related to the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The S cell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more S cells. For a UE configured with DC, the SCG is a subset of serving cells associated with a secondary node and includes a PSCell and 0 or more Scells. For a UE in RRC CONNECTED state, not configured with CA or DC, only one serving cell including only the Pcell is present. For a UE in RRC CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An S cell indicated as the PUCCH Scell belongs to the Scell PUCCH group and PUCCH transmission of related uplink control information (UCI) is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry UCI, UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
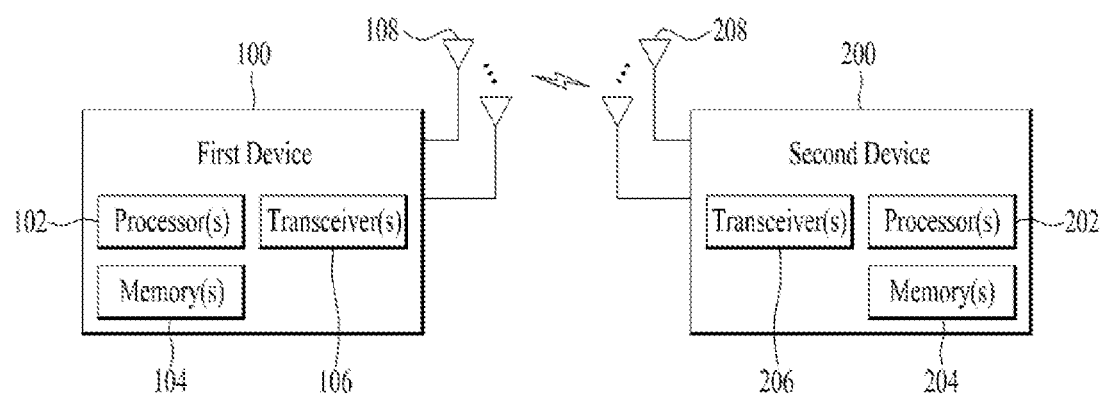
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
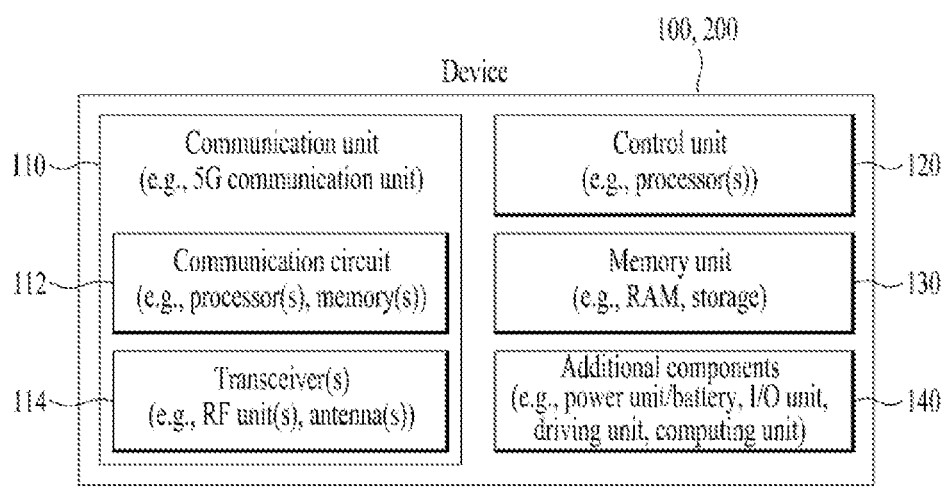
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one memory. The at least one computer memory may store instructions or programs which, when executed, cause the at least one processor operably coupled to the at least one memory to perform operations according to some embodiments or implementations of the present disclosure.

A communication device of the present disclosure includes at least one processor; and at least one computer memory operably connectable to the at least one processor and configured to store instructions for causing, when executed, the at least one processor to perform operations according to example(s) of the present disclosure described later.

Figure 4:
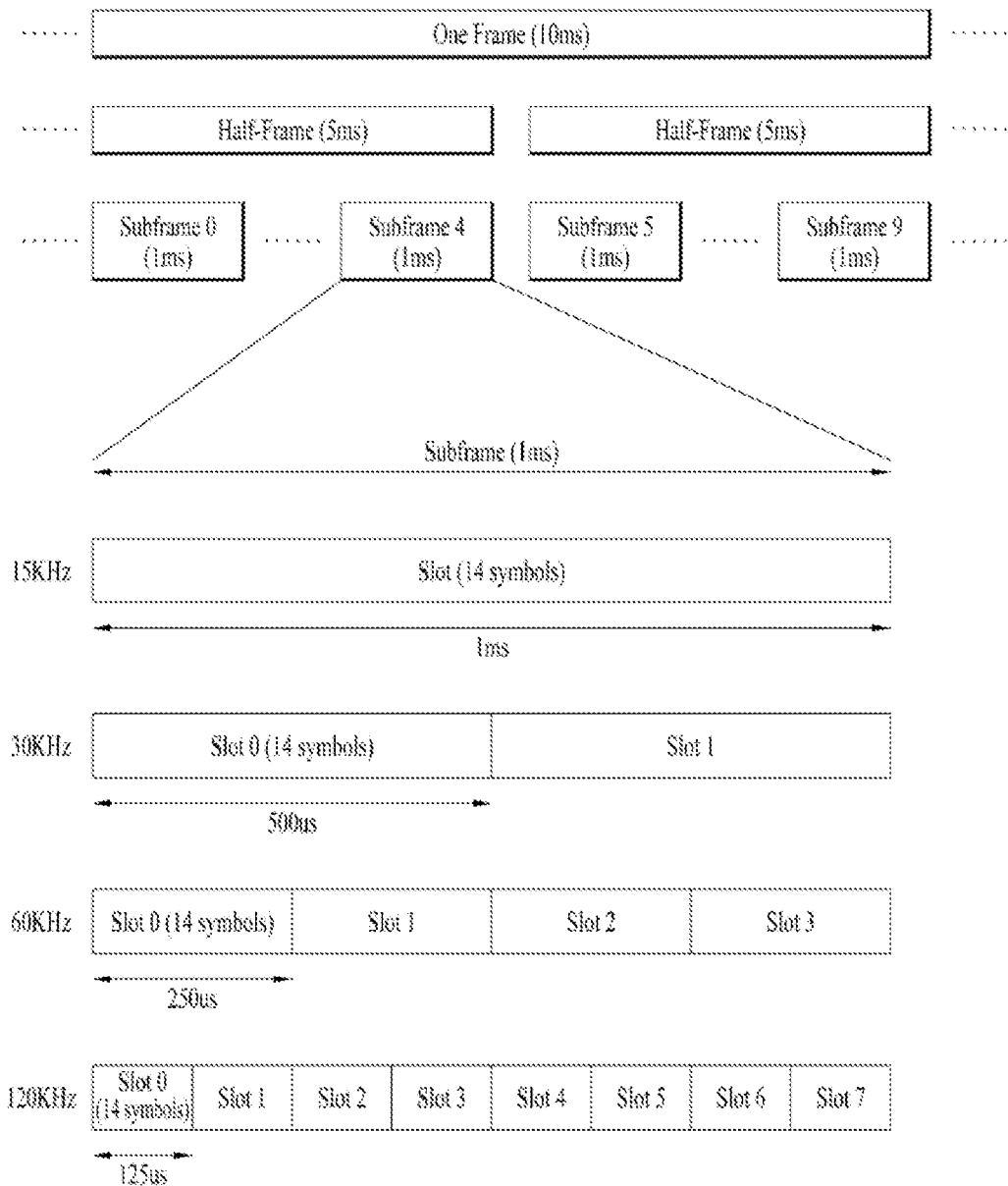
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each half-frame includes 5 subframes and a duration $T_sf$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

| u | $N^{slot}_{symb}$ | $N^{frame,u}_{slot}$ | $N^{subframe,u}_{slot}$ |
|---|---|---|---|
| 2 | 12 | 40 | 4 |

Figure 5:
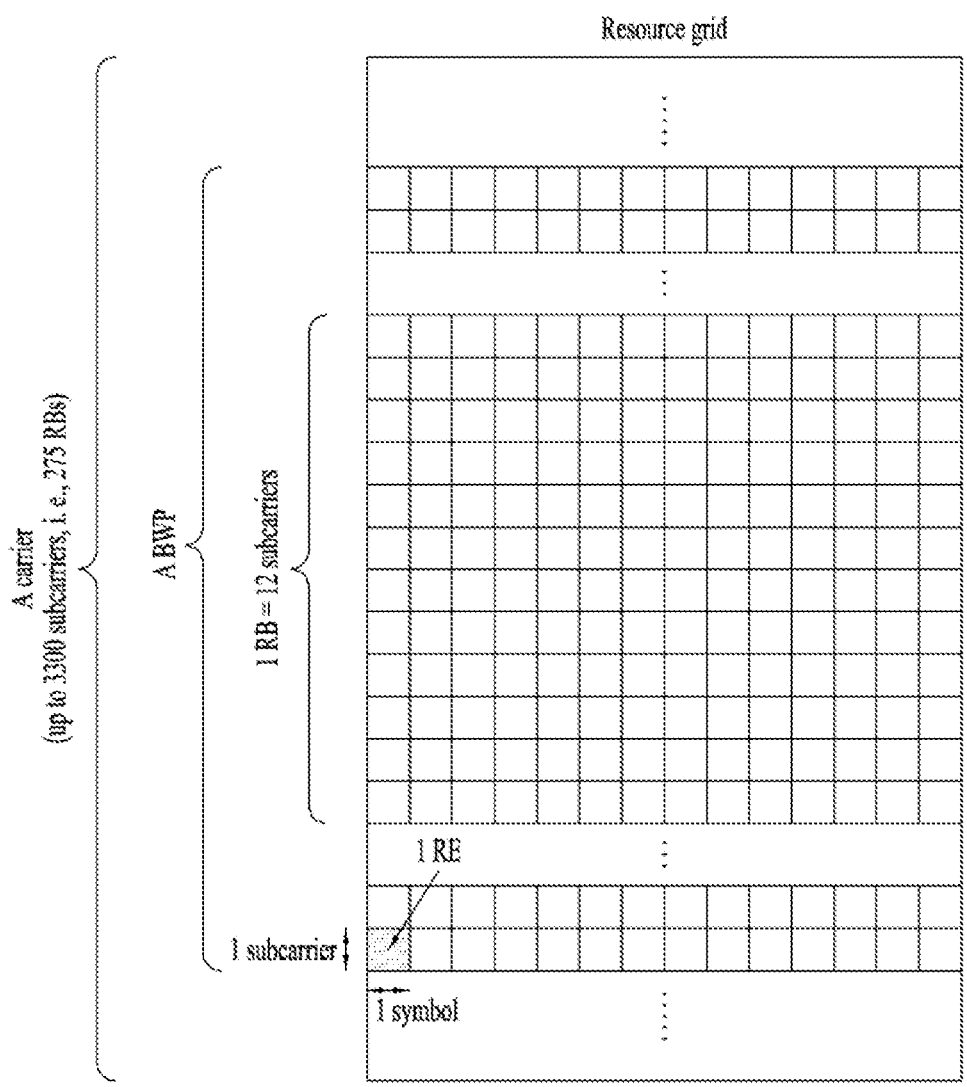
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i} - 1$, where i is a number of the BWP. The relation between a PRB $n_{PRB}$ in a BWP i and a CRB $n_{CRB}$ is given by: $n_{PRB} = n_{CRB} + N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

Figure 6:
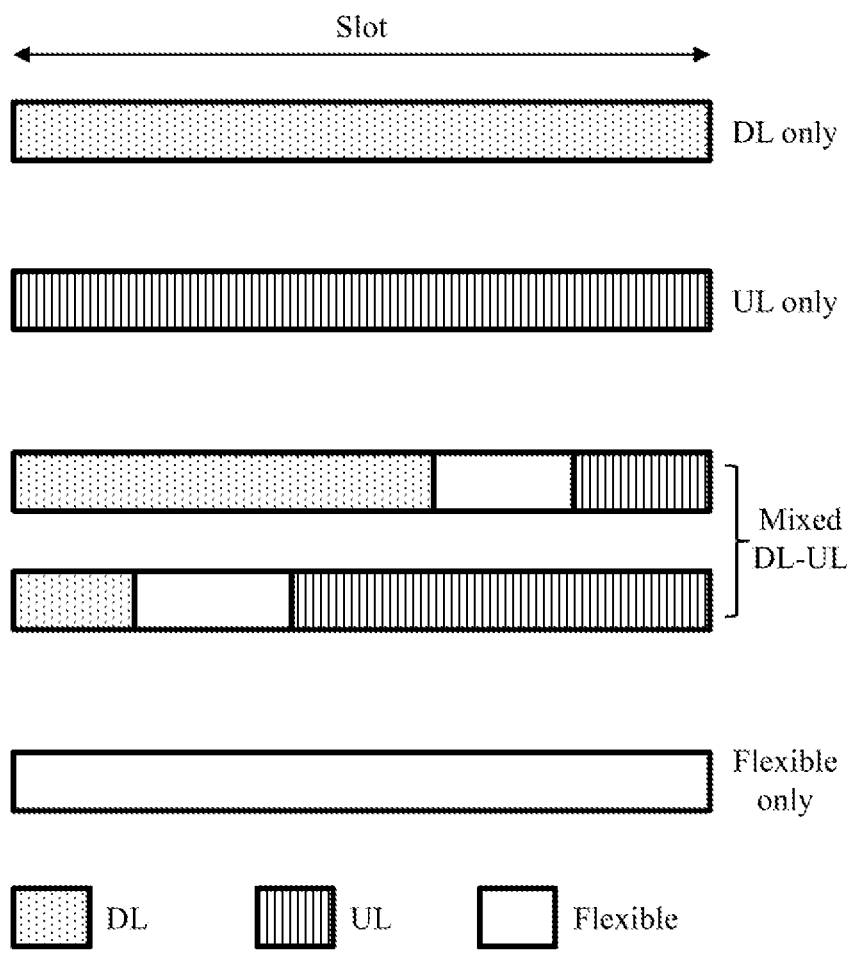
FIG. 6 illustrates slot structures available in a 3GPP based system.

FIG. 6 is a diagram illustrating exemplary slot structures which may be used in the 3GPP-based system. In the 3GPP-based system, for example, the NR system, each slot may have a self-contained structure with i) a DL control channel, ii) DL or UL data, and/or iii) a UL control channel. For example, the first N symbols of a slot may be used to deliver a DL control channel (hereinafter, referred to as a DL control region), and the last M symbols of the slot may be used to deliver a UL control channel (hereinafter, referred to as a UL control region). Each of N and M is 0 or a positive integer. A resource region (hereinafter, referred to as a data region) between the DL control region and the UL control region may be used to deliver DL data or UL data. The symbols of a single slot may be divided into group(s) of consecutive symbols available as DL symbols, UL symbols, or flexible symbols. Hereinbelow, information specifying the usages of symbols in a slot is referred to as a slot format. For example, a slot format may define which symbols are to be used for UL and which symbols are to be used for DL.

When a serving cell is to be operated in a TDD mode, the BS may configure a UL and DL allocation pattern for the serving cell by higher-layer signaling (e.g., RRC signaling). For example, the following parameters may be used to configure a TDD DL-UL pattern:

dl-UL-TransmissionPeriodicity indicating the periodicity of a DL-UL pattern;

nrofDownlinkSlots indicating the number of consecutive full DL slots at the beginning of each DL-UL pattern, where a full DL slot is a slot including DL symbols only;

nrofDownlinkSymbols indicating the number consecutive DL symbols at the beginning of the slot following the last full DL slot;

nrofUplinkSlots indicating the number of consecutive full UL slots at the end of each DL-UL pattern, where a full UL slot is a slot including UL symbols only; and nrofUplinkSymbols indicating the number of consecutive UL symbols at the end of the slot preceding the first full UL slot.

The remaining symbols configured neither as DL nor as UL among the symbols of the DL-UL pattern are flexible symbols.

Upon receipt of a configuration for a TDD DL-UL pattern, that is, a TDD UL-DL configuration (e.g., tdd-UL-DL- ConfigurationCommon or tdd-UL-DLConfigurationDedicated) by higher-layer signaling, the UE sets a slot format for each slot across the slots.

Although various combinations may be produced out of DL symbols, UL symbols, and flexible symbols, a specific number of combinations may be predefined as slot formats, and the predefined slot formats may be identified by slot format indexes. The following table lists some of the predefined slot formats. In the table, D denotes DL symbol, U denotes UL symbol, and F denotes flexible symbol.

TABLE 3

| Format | \multicolumn{14}{c}{Symbol number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | F |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | | | | | | | | |

To indicate which one of the predefined slot formats to be used for a specific slot, the BS may configure a set of slot format combinations available for each serving cell in a set of serving cells by higher-layer signaling (e.g., RRC signaling), and configure the UE to monitor a group-common PDCCH for slot format indicator(s) (SFI(s)) by higher-layer signaling (e.g., RRC signaling). DCI carried on the group-common PDCCH for the SFI(s) is referred to as SFI DCI. DCI format 2_0 is used for the SFI DCI. For example, for each serving cell in a set of serving cells, the BS may provide the UE with the (starting) position of a slot format combination ID (i.e., SFI-index) for the serving cell, a set of slot format combinations applicable to the serving cell, and a reference SCS configuration for each slot format in a slot format combination indicated by an SFI-index value in the SFI DCI. For each slot format combination in the set of slot format combinations, one or more slot formats are configured and a slot format combination ID (i.e., SFI-index) is assigned. For example, when the BS is to configure a slot format combination with N slot formats, the BS may indicate N ones of slot format indexes for the predefined slot formats (e.g., refer to Table 4) for the slot format combination. To configure the UE to monitor the group-common PDCCH for SFIs, the BS indicates an RNTI used for SFIs, SFI-RNTI and the total length of DCI payload scrambled with the SFI-RNTI to the UE. Upon detection of a PDCCH based on the SFI-RNTI, the UE may determine slot format(s) for a corresponding serving cell from an SFI-index for the serving cell among SFI-indexes in DCI payload of the PDCCH.

Symbols indicated as flexible by a TDD DL-UL pattern configuration may be indicated as UL, DL, or flexible by SFI DCI. Symbols indicated as DL/UL by the TDD DL-UL pattern configuration are not overridden as UL/DL or flexible by the SFI DCI.

When the UE is not configured with a TDD DL-UL pattern, the UE determines for each slot whether the slot is for UL or DL, and symbols allocation in the slot based on SFI DCI and/or DCI that schedules or triggers a DL or UL signal transmission (e.g., DCI format 1_0, DCI format 1_1, DCI format 1_2, DCI format 0_0, DCI format 0_1, DCI format 0_2, and DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, FR1 and FR2, and FR2 is also referred to as a millimeter wave (mmW). The following table below shows frequency ranges in which NR is operable.

TABLE 4

| Frequency Range designation | Corresponding frequency range | Subcarrier Spacing |
|---|---|---|
| FR1 | 410 MHz-7125 MHz | 15, 30, 60 Hz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. DCI including resource allocation information about the DL-SCH is referred to as PDSCH scheduling DCI, and DCI including resource allocation information about the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

If a PDCCH on a serving cell schedules a PDSCH or PUSCH of another serving cell, this is referred to as cross-carrier scheduling. Cross-carrier scheduling using a carrier indicator field (CIF) may permit a PDCCH of a serving cell to schedule resources on another serving cell. On the other hand, if a PDSCH on a serving cell schedules a PDSCH or PUSCH of the serving cell, this is referred to as self-carrier scheduling. If cross-carrier scheduling is used on a cell, the BS may provide information about a cell for scheduling the cell on which cross-carrier scheduling is used to the UE. For example, the BS may provide the UE with information as to whether a serving cell is scheduled by a PDCCH on another (scheduling) cell or by the serving cell, or which cell signals DL assignments and UL assignments for the serving cell when the serving cell is scheduled by another (scheduling) cell. In the present disclosure, a cell carrying a PDCCH is referred to as a scheduling cell, and a cell on which PUSCH or PDSCH transmission is scheduled by DCI included in the PDCCH, i.e., a cell carrying a PUSCH or a PDSCH scheduled by the PDCCH, is referred to as a scheduled cell.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides the UE with parameters (e.g., CORESET #0) for monitoring a PDCCH for scheduling a PDSCH carrying system information block 1 (SIB1). The PBCH may indicate that there is no associated SIB1. In this case, the UE is informed of not only a frequency range within which it may be assumed that there is no SSB associated with SSB1 but also another frequency range within which the SSB associated with SIB1 is to be discovered. CORESET #0, which is a CORESET for scheduling at least SIB1, may be configured through either the MIB or dedicated RRC signaling.

The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

controlResourceSetId: Indicator for identifying a CORESET associated with the search space set;
monitoringSlotPeriodicityAndOffset: A PDCCH monitoring periodicity and a PDCCH monitoring offset, for configuring slots for PDCCH monitoring.
duration: The number of consecutive slots that the search space lasts in every occasion, i.e., upon every period as given in monitoringSlotPeriodicityAndOffset.
monitoringSymbolsWithinSlot: A PDCCH monitoring pattern in a slot, indicating the first symbol(s) of the CORESET in a slot for PDCCH monitoring.
nrofCandidates: The number of PDCCH candidates per CCE aggregation level.

The UE monitors PDCCH candidates only in PDCCH monitoring occasions. The UE determines the PDCCH monitoring occasions from a PDCCH monitoring periodicity, a PDCCH monitoring offset, and a PDCCH monitoring pattern in a slot. Parameter monitoringSymbolsWithinSlot indicates, for example, the first symbol(s) for PDCCH monitoring in slots configured for PDCCH monitoring (e.g., refer to parameters monitoringSlotPeriodicityAndOffset and duration). For example, if monitoringSymbolsWithinSlot is 14 bit, the bit of monitoringSymbolsWithinSlot may represent 14 OFDM symbols of a slot, respectively, such that the most significant (left) bit represents the first OFDM symbol in the slot and the second most significant (left) bit represents the second OFDM symbol in the slot. For example, bit(s) set to 1 among the bit in monitoringSymbolsWithinSlot identify the first symbol(s) of the CORESET in the slot.

The following table shows search space sets, related RNTIs, and use cases.

TABLE 5

| Search Space Set | RNTI | Use Case |
|---|---|---|
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on primary cell | Msg.2 , Msg4 decoding in RACH |
| Type1-PDCCH CSS set | P-RNTI on a primary cell | Paging |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI1(s) | Decoding |
| USS set | C-RNTI, or MCS-C-RNTI, or CS-RNTI(s) | User specific PDSCH decoding |

The following table shows DCI formats which are capable of being carried by a PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PUSCH in one cell |
| 1_1 | Scheduling of PUSCH in one cell |
| 2_0 | Notifying a group of UEs of the slot format |
| 2_1 | Notifying a group of UEs of the PRB(s) and OFDM symbol(s) where UE no transmission is inteded for the UE |
| 2_2 | Transmission of TPC commands for PUCCH and PUSCH |
| 2_3 | Transmission of a group of TPC commands tor SRS transmissions by one or more UEs |

DCI format 0_0 may be used to schedule a transport block (TB)-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. In the case of a CSS, DCI format 0_0 and DCI format 1_0 have a fixed size after a BWP size is initially given by RRC. In the case of a USS, in DCI format 0_0 and DCI format 1_0, the sizes of fields except for the size of a frequency domain resource assignment (FDRA) field has a fixed size, whereas the size of the FDRA field may be changed through a related parameter configuration by the BS. In DCI format 0_1 and DCI format 1_1, the sizes of DCI fields may be changed through various RRC reconfigurations by the BS. DCI format 2_0 may be used to transfer dynamic slot format information (e.g., SFI DCI) to the UE, and DCI format 2_1 may be used to transfer DL pre-emption information to the UE.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 7.

(0) PUCCH Format 0 (PF0 or F0)
Supported UCI payload size: up to K bit (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)
Supported UCI payload size: up to K bit (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bit and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)
Supported UCI payload size: more than K bit (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bit. PUCCH format 2 carries UCI of a larger bit size than K bit and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)
Supported UCI payload size: more than K bit (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. The UE transmits the UCI by applying DFT to encoded UCI bit. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)
Supported UCI payload size: more than K bit (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 7

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bit). For example, the UE may select one of the following PUCCH resource sets according to the number of UCI bit, $N_{UCI}$.—PUCCH resource set #0, if the number of UCI bit=<2

PUCCH resource set #1, if 2<the number of UCI bit=<$N_1$
. . .
PUCCH resource set #(K−1), if $N_{K-2}$<the number of UCI bit=<$N_{K-1}$ Here, K represents the number of PUCCH resource sets (K>1) and $N_i$ represents a maximum number of UCI bit supported by PUCCH resource set #i. For example, PUCCH resource set #1 may include resources of PUCCH formats 0 to 1, and the other PUCCH resource sets may include resources of PUCCH formats 2 to 4 (see Table 8).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should have UL resources available for the UE and, for DL-SCH data reception, the UE should have DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in an RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL assignments. The BS may allocate the DL resources to the UE using SPS. The BS may configure a periodicity of configured DL assignments through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

*Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
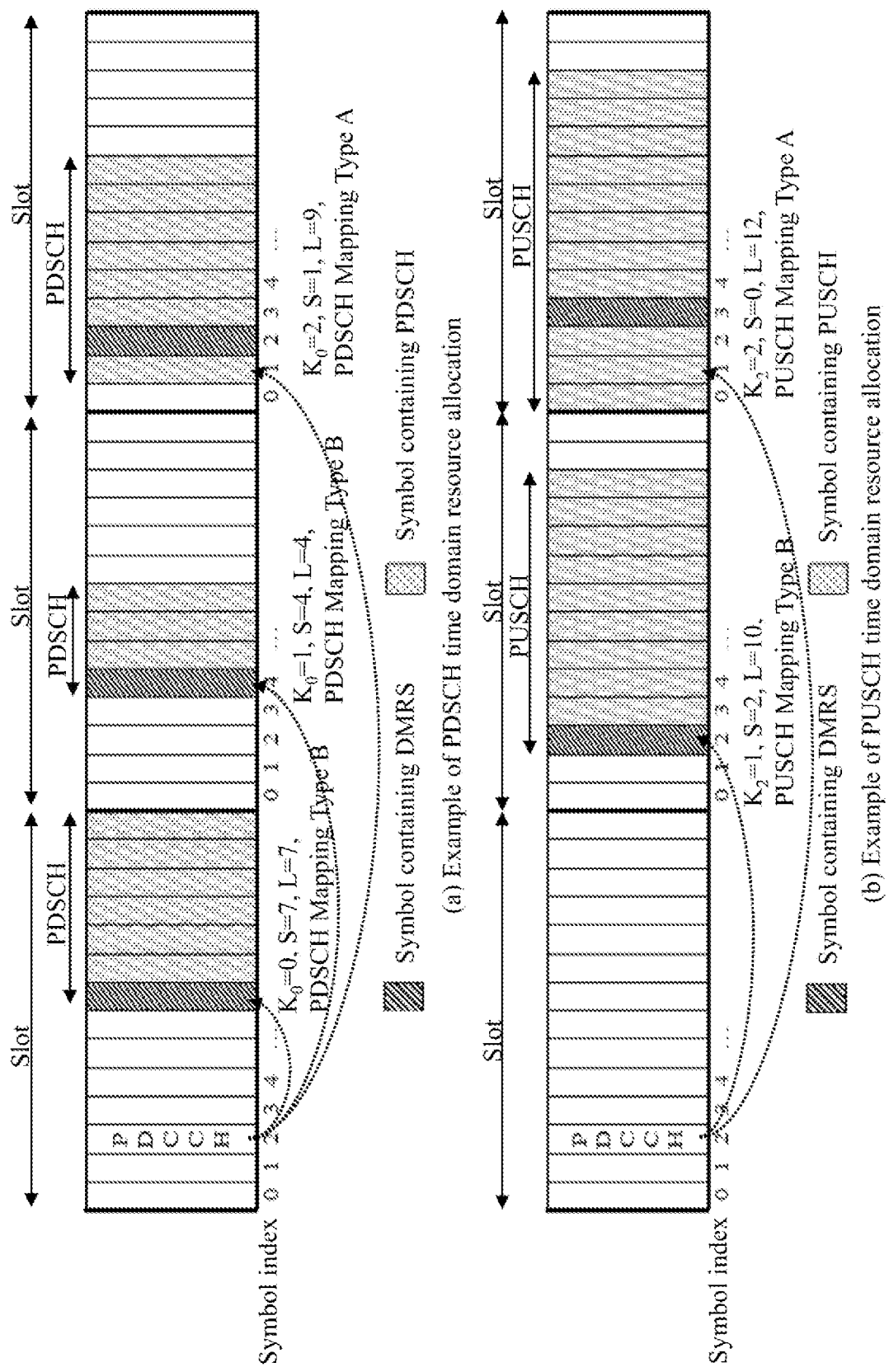
FIG. 7 illustrates an example of PDSCH time domain resource allocation (TDRA) caused by a PDCCH and an example of PUSCH TDRA caused by the PDCCH.
Figure 8:
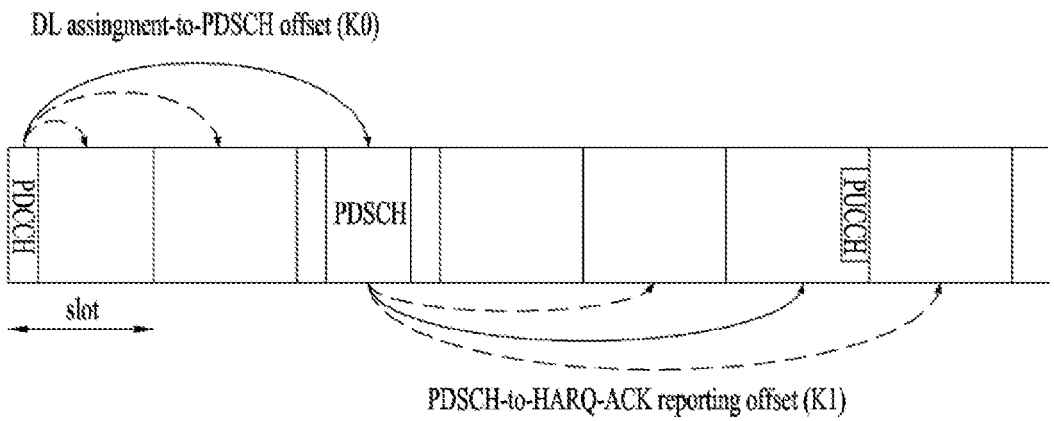
FIG. 8 illustrates a hybrid automatic repeat request-acknowledgement (HARQ-ACK) transmission/reception procedure.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH, or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH, or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCH transmission, information about a BWP for PDSCH or PUSCH transmission, and/or information about RBs for PDSCH or PUSCH transmission to the UE.

*Resource Allocation by RRC

As mentioned above, there are two types of transmission without a dynamic grant: configured grant Type 1 and configured grant Type 2. In configured grant Type 1, a UL grant is provided by RRC signaling and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC signaling per serving cell and per BWP. Multiple configurations may be simultaneously activated on different serving cells.

When configured grant Type 1 is configured, the UE may be provided with the following parameters through RRC signaling:

cs-RNTI corresponding to a CS-RNTI for retransmission;
periodicity corresponding to a periodicity of configured grant Type 1;
timeDomainOffset indicating an offset of a resource with respect to system frame number (SFN)=0 in the time domain;
timeDomainAllocation value m that provides a row index m+1 pointing to the allocation table, indicating a combination of the start symbol S, the length L, and the PUSCH mapping type;
frequencyDomainAllocation that provides frequency domain resource allocation; and
mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbols PerSlot), for all N>=0, where numberOfSlotsPerFrame and numberOfSymbolsPerSlot indicate the number of consecutive slots per frame and the number of consecutive OFDM symbols per slot, respectively, (refer to Table 1 and Table 2).

For configured grant Type 2, the UE may be provided with the following parameters by the BS through RRC signaling:
cs-RNTI corresponding to a CS-RNTI for activation, deactivation, and retransmission; and
periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:

[(SFN*numberOfSlotsPerFrame*numberOfSymbolsPerSlot)+ (slot number in the frame*numberOfSymbolsPerSlot)+symbol number in the slot]=[(SFN$_{start\ time}$ *numberOfSlotsPerFrame*numberOfSymbolsPerSlot+ slot$_{start}$ $_{time}$*numberOfSymbolsPerSlot+ symbol$_{start}$ $_{time}$)+N*periodicity] modulo (1024*numberOfSlotsPerFrame*numberOfSymbolsPerSlot), for all N>=0, where SFN$_{start\ time}$, Slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively, (refer to Table 1 and Table 2).

On DL, the UE may be configured with SPS per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:
cs-RNTI corresponding to a CS-RNTI for activation, deactivation, and retransmission;
nrofHARQ-Processes that provides the number of HARQ processes for SPS; and
periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+ Slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively, (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 9 and Table 10. Table 9 shows an example of special fields for DL SPS and UL grant Type 2 scheduling activation PDCCH validation, and Table 10 shows an example of special fields for DL SPS and UL grant Type 2 scheduling release PDCCH validation

TABLE 8

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 9

|  | DCI format 0_0 | DCI format 1_1 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment or UL grant for DL SPS or UL grant Type 2, and a corresponding MCS are provided by resource assignment fields (e.g., a TDRA field providing a TDRA value m, an FDRA field providing frequency RB allocation, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

FIG. 7 illustrates a HARQ-ACK transmission/reception procedure.

Referring to FIG. 7, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bit when spatial bundling is not configured and one bit when spatial bundling is configured. When a HARQ-ACK transmission timing for a plurality of PDSCHs is designated as slot n+K1, UCI transmitted in slot #n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically configured by a (UE-specific) higher layer (e.g., RRC) signal. For example, the HARQ-ACK payload size of the semi-static HARQ-ACK codebook and the (maximum) HARQ-ACK payload (size) transmitted through one PUCCH in one slot may be determined based on the number of HARQ-ACK bit corresponding to a combination (hereinafter, bundling window) of all DL carriers (i.e., DL serving cells) configured for the UE and all DL scheduling slots (or PDSCH transmission slots or PDCCH monitoring slots) in which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, HARQ-ACK information for the PDSCH may be transmitted in slot #(m+k). As an example, k E {1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k E {1, 2, 3, 4, 5, 6, 7, 8}, the HARQ-ACK information of slot #n may include HARQ-ACK corresponding to slot #(n-8) to slot #(n-1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on a PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In a dynamic HARQ-ACK codebook scheme, DL scheduling DCI may include a counter-DAI (i.e., c-DAI) and/or a total-DAI (i.e., t-DAI). Here, the DAI indicates a downlink assignment index and is used by the BS to inform the UE of transmitted or scheduled PDSCH(s) that are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be permitted to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI/data is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 9:
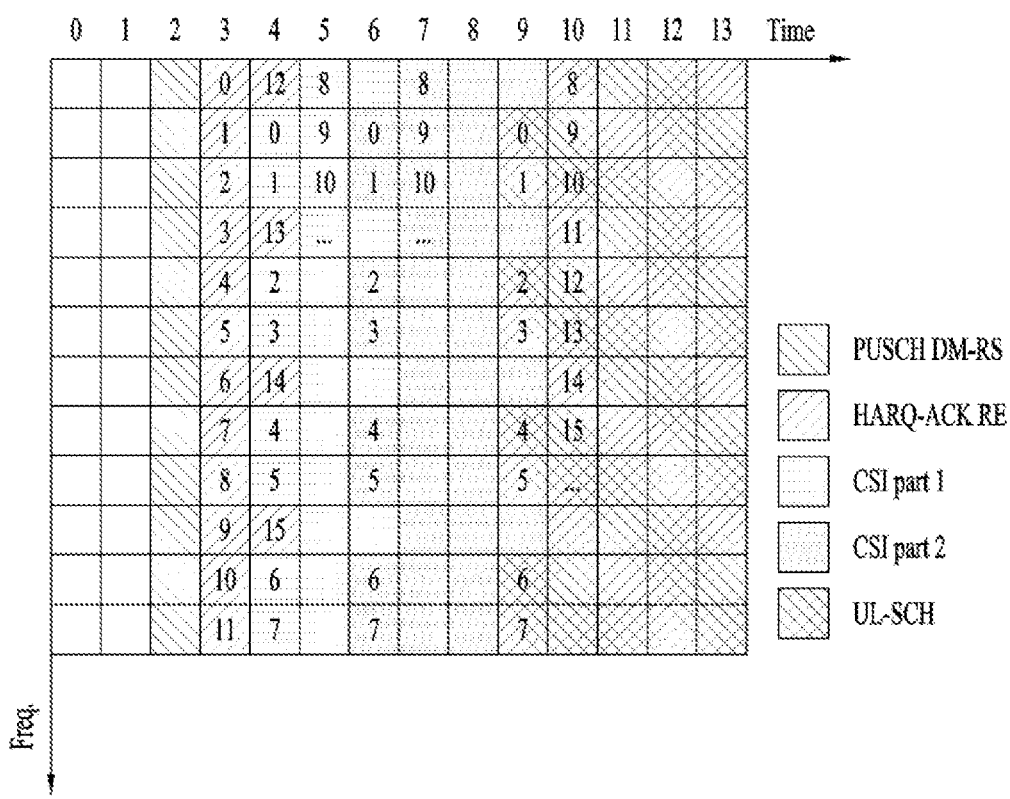
FIG. 9 illustrates an example of multiplexing uplink control information (UCI) with a PUSCH.

FIG. 9 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 9 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 10:
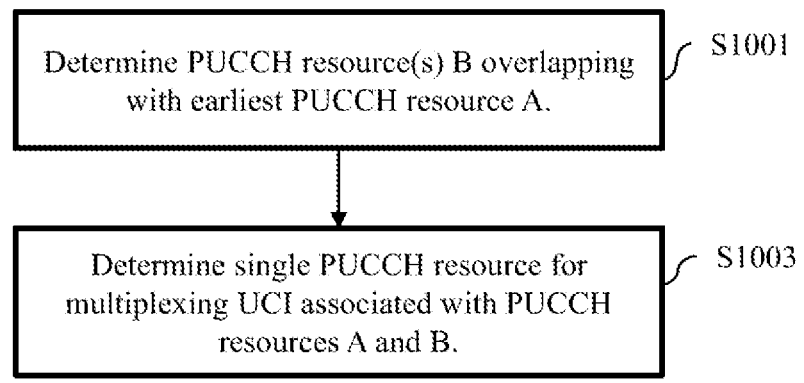
FIG. 10 illustrates an example of a process for a UE with overlapping physical uplink control channels (PUCCHs) in a single slot to handle collision between uplink (UL) channels.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
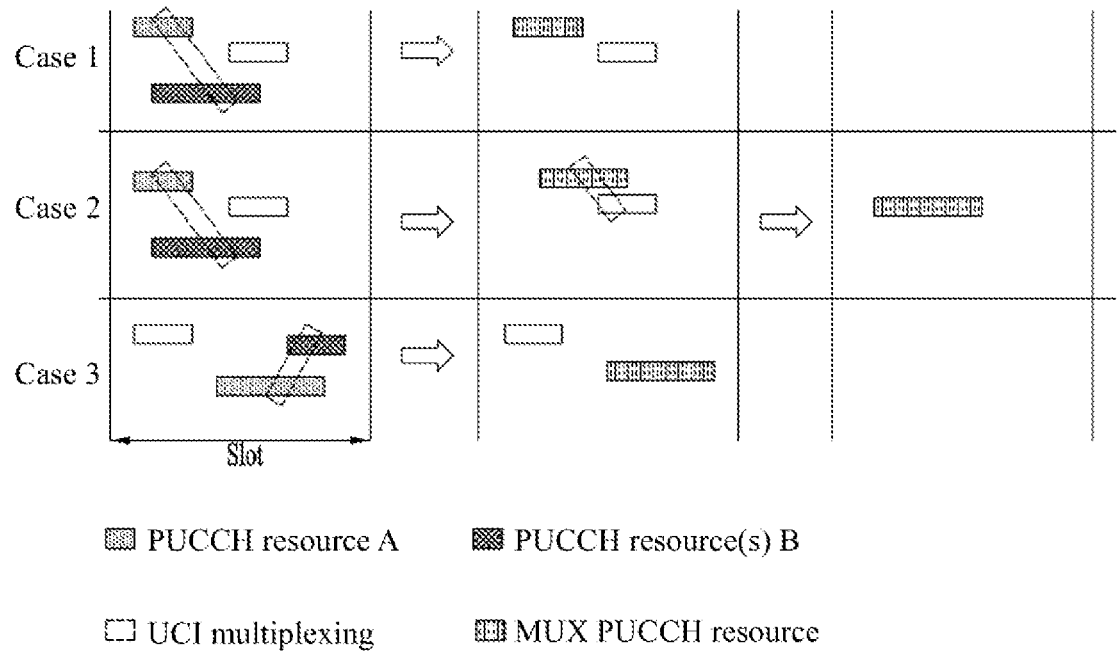
FIG. 11 illustrates cases for performing UCI multiplexing based on FIG. 12.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
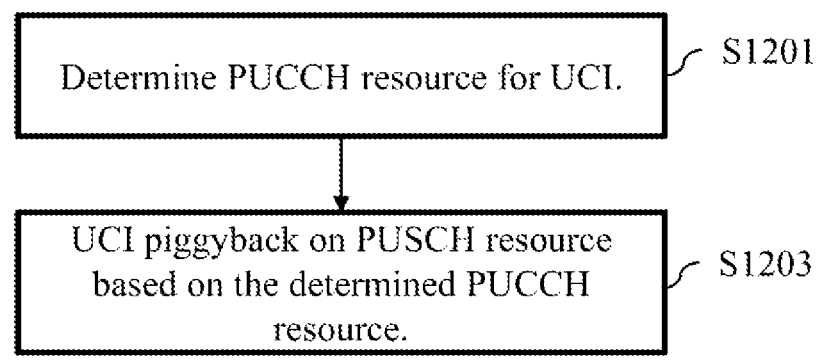
FIG. 12 illustrates a process for a user equipment (UE) with an overlapping PUCCH and PUSCH in a single slot to handle collision between UL channels.

FIG. 12 illustrates a process for a UE with an overlapping PUCCH and PUSCH in a single slot to handle collision between UL channels.

To transmit UCI, the UE may determine a PUCCH resource (S1201). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 13:
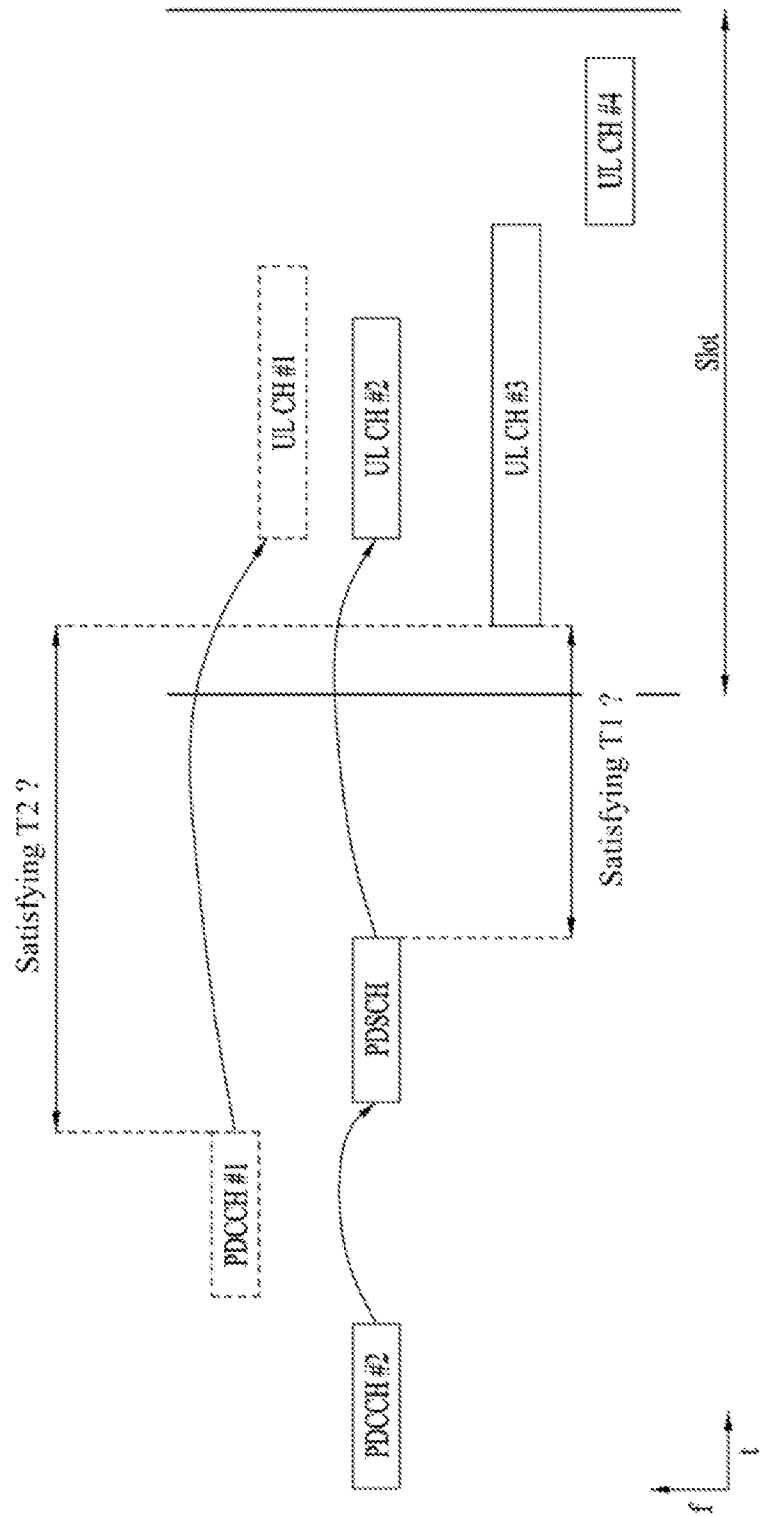
FIG. 13 illustrates UCI multiplexing considering a timeline condition.

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time N1+from the start symbol of the earliest channel among the overlapping PUCCH(s) and/or PUSCH(s) (on the time axis). T1 may be determined based on i) a minimum PDSCH processing time N1 defined according to a UE processing capability, and/or ii) d1 predefined as an integer equal to or greater than 0 according to a scheduled symbol position, a DMRS position in the PUSCH, BWP switching, etc.

For example, T1 may be determined as follows: $T1=(N1+d1)*(2048+144)*\kappa*2^{-u}*T_c$. N1 is based on u of Table 10 and Table 11 for UE processing capabilities #1 and #2, respectively, and u is one of ($u_{PDCCH}$, $u_{PDSCH}$, $u_{UL}$), that causes the largest T1, where $u_{PDCCH}$ corresponds to a subcarrier spacing of a PDCCH for scheduling the PDSCH, $u_{PDSCH}$ corresponds to a subcarrier spacing of the scheduled PDSCH, $u_{UL}$ corresponds to a subcarrier spacing of a UL channel on which HARQ-ACK is to be transmitted, and $\kappa=T_c/T_f=64$. In Table 10, in the case of $N_{1,0}$, if a PDSCH DMRS position of an added DMRS is $1_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, dl=7−i for i<7 and, otherwise, dl=0. If the PDSCH has mapping type B for UE processing capability #1, dl may be 0 when the number of allocated PDSCH symbols is 7, dl may be 3 when the number of allocated PDSCH symbols is 4, dl may be 3+d when the number of allocated PDSCH symbols is 2, where d is the number of overlapping symbols of the scheduling PDCCH and the scheduled PDSCH. If the PDSCH mapping type is B for UE processing capability #2, dl may be 0 when the number of allocated PDSCH symbols is 7, and dl may correspond to the number of overlapping symbols of the scheduling PDCCH and the scheduled PDSCH when the number of allocated PDSCH symbols is 4. Further, if the number of allocated PDSCH symbols is 2, dl may be 3 when the scheduling PDSCH is within a 3-symbol CORESET and the CORESET and the PDSCH have the same starting symbol, and dl may be the number of overlapping symbols of the scheduling PDCCH and the scheduled PDSCH for the other cases. In the present disclosure T1 may also be referred to as T_proc, 1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) d2 predefined as an integer equal to or greater than 0 according to the scheduled symbol position, BWP switching, etc. d2 may be categorized into d2,1 related to the scheduled symbol position and d2,2 related to BWP switching.

For example, T2 may be determined as follows: $T2=\max\{(N2+d_{2,1})*(2048+144)*\kappa*2^{-u}*T_c, d_{2,2}\}$. N2 is based on u of Table 12 and Table 13 for UE timing capabilities #1 and #2, respectively, and u is one of ($u_{DL}$, $u_{UL}$), that causes the largest T1, where $u_{DL}$ corresponds to a subcarrier spacing of a PDCCH carrying DCI for scheduling a PUSCH, $u_{UL}$ corresponds to a subcarrier spacing of the PUSCH, and $\kappa=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 10 shows a PDSCH processing time for PDSCH processing capability #1 of the UE, Table 11 shows a PDSCH processing time for PDSCH processing capability #2 of the UE, Table 12 shows a PUSCH preparation time for PUSCH timing capability #1 of the UE, and Table 13 shows a PUSCH processing time for PUSCH timing capability #2 of the UE.

TABLE 10

| | PDSCH decoding time N1 [symbols] | |
| --- | --- | --- |
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 11

| u/SCS | PDSCH decoding time N1 [symbols] |
| --- | --- |
| 0/15 kHz | 3 |
| 1/30 kHz | 4.5 |
| 2/60 kHz | 9 for frequency range 1 |

TABLE 12

| u/SCS | PDSCH preparation time N2 [symbols] |
| --- | --- |
| 0/15 kHz | 10 |
| 1/30 kHz | 12 |
| 2/60 kHz | 23 |
| 3/120 kHz | 36 |

TABLE 33

| u/SCS | PDSCH decoding time N1 [symbols] |
| --- | --- |
| 0/15 kHz | 5 |
| 1/30 kHz | 5.5 |
| 2/60 kHz | 11 for frequency range 1 |

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 14:
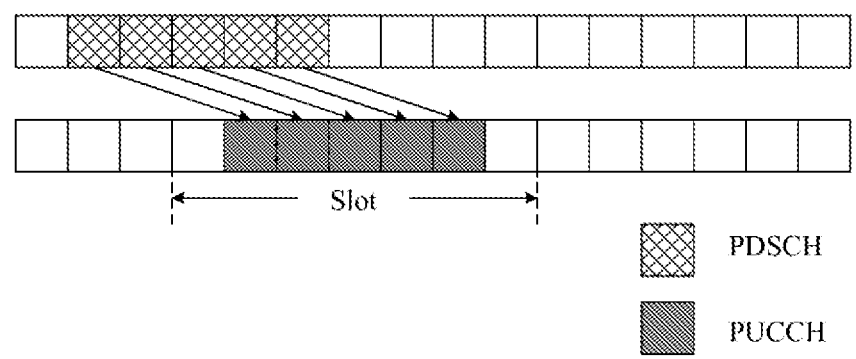
FIG. 14 illustrates transmission of a plurality of HARQ-ACK PUCCHs in a slot.

FIG. 14 illustrates transmission of a plurality of HARQ-ACK PUCCHs in a slot.

The current NR standard specification (e.g., 3GPP TS 38.213 V15.2.0) specifies that the UE is not expected to transmit a PUCCH with HARQ-ACK information in more than one slot. Accordingly, according to the current NR standard specification, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Accordingly, in order to flexibly and efficiently use resources and support services, it is better to allow transmission of a plurality of (non-overlapping) HARQ-ACK PUCCHs (or PUSCHs) in one slot as illustrated in FIG. 14.

A control channel corresponding to a specific target service, QoS, a block error rate (BLER) requirement, reliability requirement, a latency requirement and/or processing time (or a control channel for scheduling a data channel corresponding thereto) includes DCI. To support the specific target service, QoS, BLER requirement, reliability requirement, latency requirement and/or processing time, sizes of DCI fields may be set such that the DCI sizes are different from the existing DCI size. For example, as a method for reducing downlink signaling overhead among methods for supporting a highly reliable communication service within a short time in packet transmission/reception, such as URLLC, configuring a DCI field having a configurable size may be considered. In other words, a DCI format in which scheduling for URLLC support can be easily performed or downlink signaling overhead can be reduced as compared to DCI formats 0_0/0_1/1_0/1_1 by configuring DCI field(s) differently according to the needs of a BS is considered.

For convenience of description, DCI (e.g., DCI field(s) included in DCI, or DCI having DCI field(s) having size(s) configurable by a BS) included in the control channel corresponding to the specific target service, QoS, BLER requirement, reliability requirement, latency requirement and/or processing time (or a control channel for scheduling a data channel corresponding thereto) is referred to as a new DCI format in the following. The new DCI format may include DCI format 0_2 used to schedule a PUSCH in a cell and DCI format 1_2 used to schedule a PDSCH in a cell.

When a UE is scheduled to receive a PDSCH by DCI, a time domain resource assignment (TDRA) field of the DCI provides a row index m+1 to an assignment table. The indexed row defines, for example, a slot offset $K_0$ and SLIV, or directly defines a start symbol S, an assignment length L, and a PDSCH mapping type to be assumed in PDSCH reception. When parameter values of the indexed row are provided, in some scenarios:

a slot allocated for the PDSCH is floor$\{n*(2^{uPDSCH}/2^{uPDCCH})\} \pm K_0$, where n is a slot having scheduling DCI, $K_0$ is based on the numerology of the PDSCH, and uPDSCH and uPDCCH are subcarrier spacing configurations for PDSCH and PDCCH, the start symbol S relative to the start of the slot, and the number L of consecutive symbols counting from the start symbol S to which the PDSCH is allocated are determined from the start and length indicator SLIV: SLIV=14*(L−1)+S if (L−1)<=7, or else SLIV=14*(14−L+1)+(14−1−S), where 0<L<=14−S, and the PDSCH mapping type is set to type A or type B.

In the above-mentioned scenarios, in the PDSCH allocated by SLIV, the boundary of the slot (e.g., the start of the slot) is used as a reference point in determining the PDSCH start symbol.

Figure 15:
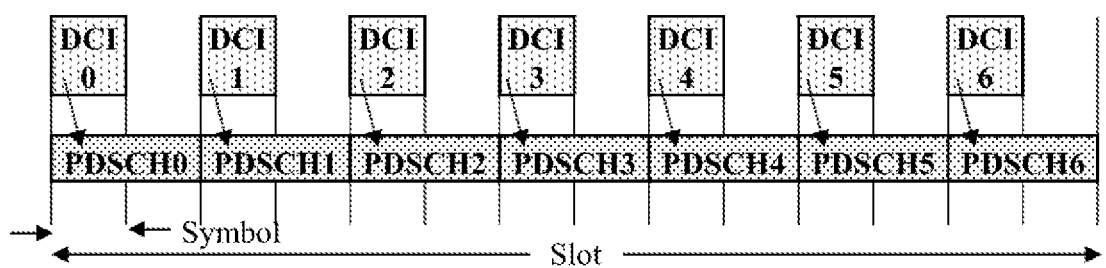
FIG. 15 illustrates a plurality of transmissions scheduled in a slot.

FIG. 15 illustrates a plurality of transmissions scheduled in a slot.

It may be desirable to support scheduling of a plurality of transmissions in a slot in order to support low-latency communication such as URLLC. For example, it may be desirable to support a plurality of PUSCHs or a plurality of PDCCHs in a slot. For example, in order to schedule a plurality of transmissions (e.g., a plurality of PDSCHs or a plurality of PUSCHs) in a slot, a plurality of SLIVs corresponding to the plurality of transmissions needs to be respectively indicated through specific fields (e.g., TDRA field) in related DCI. For example, referring to FIG. 15, to schedule 7 2-symbol PDSCHs PDSCH0 to PDSCH6 in a 14-symbol slot, 7 separate SLIVs (e.g., SLIV n={symbol #0 and #1}, SLIV n+1={symbol #2 and #3}, . . . , SLIV n+6={symbol #12 and #13}) need to be indicated by the TDRA fields. Since a BS sets candidate TDRA entries through RRC signaling, the BS needs to set a TDRA table including at least 7 different TDRA entries that can indicate at least 7 different SLIVs through RRC signaling in order to allow scheduling of the 7 2-symbol PDSCHs illustrated in FIG. 15. This is because a PDSCH allocated by an SLIV uses the boundary of a slot as a reference point in determining the start symbol of the PDSCH.

On the other hand, for a PDSCH allocated by an SLIV, when the start symbol of a monitoring occasion to which a PDCCH belongs is used as a reference point in determining the start symbol of the PDSCH, 7 2-symbol PDSCHs can be scheduled in the 14-symbol slot using only a state corresponding to one SLIV. Referring to FIG. 15, the TDRA field of each of DCI0 to DCI6, for example, may determine a value representing the start symbols of the corresponding PDSCH determined based on the start of a PDCCH monitoring occasion carrying the corresponding DCI. Referring to FIG. 15, for example, since each of DCI0 to DCI 6 schedules a 2-symbol PDSCH zero symbol after the start of the corresponding DCI, a TDRA entry including an SLIV that can indicate that there is a 0 symbol offsets from the start of the corresponding PDCCH monitoring occasion and the symbol length is 0 may be configured. To use this new reference point-based PDSCH resource allocation method for cross-carrier scheduling (e.g., a case in which a carrier for carrying a PDCCH (hereinafter, a PDCCH transmission carrier) and a carrier for carrying a PDSCH (hereinafter, a PDSCH transmission carrier) are different), the following may need to be considered.

If cross-carrier scheduling is configured, a subcarrier spacing (SCS) of the PDCCH transmission carrier may differ from the SCS of the corresponding PDSCH transmission carrier. If the SCS of the PDCCH transmission carrier differs from the SCS of the corresponding PDSCH transmission carrier (if SCS of PDCCH transmission carrier<SCS of PDCCH transmission carrier), the start symbol of the monitoring occasion to which the PDCCH belongs may be mapped to a plurality of symbols of the PDSCH transmission carrier, or conversely (if SCS of PDCCH transmission carrier>SCS of PDCCH transmission carrier), the start symbol of the monitoring occasion to which the PDCCH belongs may not be aligned with one symbol of the PDSCH transmission carrier. This may cause ambiguity with respect to resource allocation of the PDSCH.

In order to prevent such ambiguity, a rule may be defined such that new reference point-based PDSCH resource allocation is not set for a carrier for which cross-carrier scheduling is configured (or such that a UE does not expect the configuration). That is, a rule may be defined such that new reference point-based PDSCH resource allocation can be configured only for a carrier for which self-carrier scheduling (e.g., scheduling in which the PDCCH transmission carrier is identical to the corresponding PDSCH transmission carrier) is configured. When new reference point-based PDSCH resource allocation is configured for a cell, a UE and a BS may determine a start symbol value indicating a start symbol of a PDSCH based on the start of a PDCCH monitoring occasion to which DCI that schedules the PDSCH belongs when determining the start symbol value of the PDSCH, for example.

Alternatively, when cross-carrier scheduling is configured for at least one carrier, a rule may be defined such that new reference point-based PDSCH resource allocation is not configured (or such that a UE does not expect the configuration). That is, a rule may be defined such that new reference point-based PDSCH resource allocation can be configured only when self-carrier scheduling (e.g., scheduling in which the PDCCH transmission carrier is identical to the corresponding PDSCH transmission carrier) is configured for all carriers.

Alternatively, when cross-carrier scheduling is configured, a rule may be defined such that new reference point-based PDSCH resource allocation is not configured (or such that a UE does not expect the configuration) if the SCS of a scheduled cell is less than the SCS of a scheduling cell. That is, when cross-carrier scheduling is configured, a rule may be defined such that new reference point-based PDSCH resource allocation can be configured only when the SCS of the scheduled cell is equal to or greater than the SCS of the scheduling cell.

Alternatively, when cross-carrier scheduling is configured, a rule may be defined such that new reference point-based PDSCH resource allocation is applied only when the SCS of a scheduled cell is equal to or greater than the SCS of a scheduling cell and slot boundary reference point-based PDSCH resource allocation is applied if not.

When application of a new reference point to a cell is signaled, a BS may determine SLIV such that the SLIV indicates a relative starting position with respect to a start symbol of a PDCCH monitoring occasion in which DCI scheduling a PDSCH for the cell is transmitted, for example, and transmit the DCI including information on the SLIV (e.g., a TDRA entry). When application of a new reference point to a cell is signaled, a UE that has received a PDSCH scheduled by DCI may determine a start symbol S of the PDSCH on the assumption that it is a value relative to the start symbol $S_0$ of the PDCCH monitoring occasion from which the DCI is detected when determining the start symbol S of the PDSCH based on the SLIV determined based on the DCI.

In some implementations of the present disclosure, the new reference point-based PDSCH resource allocation may be restrictively used for a new DCI format for scheduling a PDSCH instead of DCI format 1_0 and DCI format 1_1 among DCI formats for scheduling the PDSCH. For example, in some implementations of the present disclosure, PDSCH resource allocation is applied to DCI format 1_0 and DCI format 1_1 based on a slot boundary reference point, and a new reference point may be applied only to DCI formats 1_2 for scheduling a PDSCH. For example, in the case of DCI format 1_0 and/or DCI format 1_1, a BS may allocate PDSCH resources based on a slot boundary, and a UE may determine PDSCH resource allocation based on the slot boundary. In the case of DCI format 1_2, for example, a rule may be defined such that new reference point-based PDSCH resource allocation is permitted to be configured (or such that a UE expects the configuration) only when the SCS of a scheduled cell is equal to the SCS of a scheduling cell in some implementations of the present disclosure. For example, if the SCS of the scheduled cell is equal to the SCS of the scheduling cell, the BS may be permitted to notify the UE of application of a new reference point for DCI format 1_2 to inform the UE of the start symbol and the number of symbols of a PDSCH according to an SLIV determined based on the new reference point.

In the present disclosure, priority, a target service (e.g., URLLC), QoS, a block error rate (BLER) requirement, reliability requirement, latency requirement and/or processing time for a specific channel may be set through a higher layer signal, explicitly indicated through a specific field of DCI, distinguished by a search space to which a PDCCH (that schedules DL/UL data) belongs, distinguished by CORESET to which the PDCCH (that schedules DL/UL data) belongs, distinguished by RNTI, distinguished by a DCI format, or distinguished by CRC masking of the PDCCH. The example(s) of the present disclosure may also be applied to handling for a plurality of types of channels distinguished by the specific field of DCI, the search space to which the PDCCH belongs, CORESET to which the PDCCH belongs, RNTI, the DCI format and/or CRC masking of the PDCCH without explicitly distinguishing target services, QoS, BLER requirements, reliability requirements, latency requirements and/or processing times for channels. In the present disclosure, "a channel corresponding to a specific target service, QoS, a BLER requirement, a reliability requirement, a latency requirement and/or processing time" may be replaced by "a specific channel distinguished by a specific field of DCI, a search space to which the PDCCH belongs, a CORESET to which the PDCCH belongs, RNTI, a DCI format and/or CRC masking of the PDCCH from among a plurality of types of channels" and applied to example(s) of the present disclosure.

Figure 16:
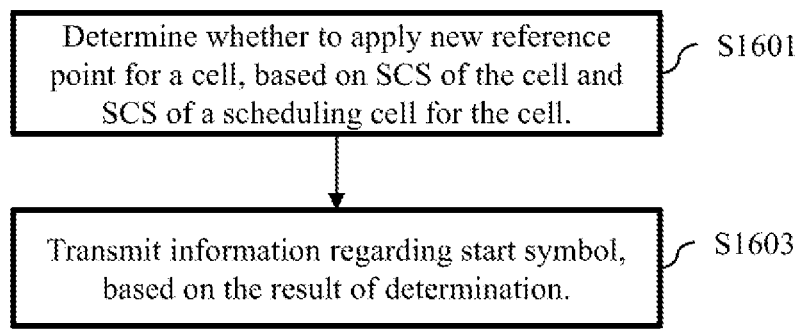
FIG. 16 and FIG. 17 illustrate an example of a DCI transmission/reception flow according to some implementations of the present disclosure.
Figure 17:
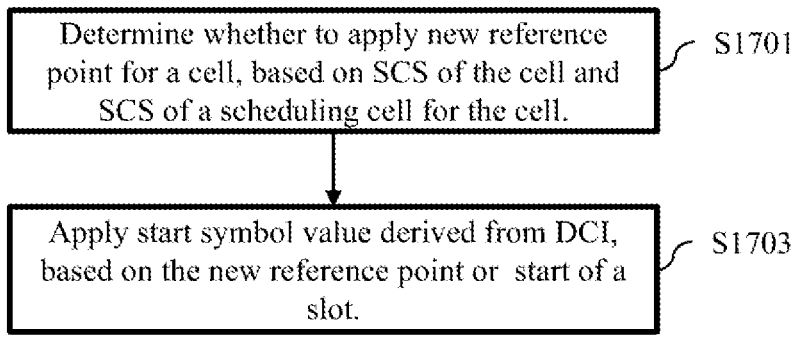

FIG. 16 and FIG. 17 illustrate another example of a DCI transmission/reception flow according to some implementations of the present disclosure.

ABS may perform operations according to some implementations of the present disclosure for DCI transmission. The BS may include at least one transceiver, at least one processor, and at least one computer memory operably connectable to the at least one processor and storing instructions that, when executed, cause the at least one processor to perform operations according to some implementations of the present disclosure. A processing apparatus for the BS may include at least one processor and at least one computer memory operably connectable to the at least one processor and storing instructions that, when executed, cause the at least one processor to perform operations according to some implementations of the present disclosure. A computer-readable storage medium may store at least one computer program including instructions that, when executed by at least one processor, cause the at least one processor to perform operations according to some implementations of the present disclosure. Referring to FIG. 16, in some implementations of the present disclosure, the operations may include, for example, determining whether to apply a reference point other than the start of a slot allocated for a PDSCH to a cell based on a subcarrier spacing of the cell and a subcarrier spacing of a scheduling cell for the cell (S1601). The operations may include determining a start symbol value representing a start symbol of a PDSCH to be transmitted on the cell based on the determination, and transmitting DCI including information on the start symbol value (hereinafter, symbol information) on the scheduling cell for the cell (S1603). The determining of whether to apply the start symbol value based on the reference point may include applying the symbol information based on the reference point when the subcarrier spacing of the cell is equal to the subcarrier spacing of the scheduling cell. The determining of whether to apply the start symbol value based on the reference point may include further receiving information indicating application of the reference point when the subcarrier spacing of the cell is equal to the subcarrier spacing of the scheduling cell. The reference point may be the start of a physical uplink control channel (PDCCH) monitoring occasion in which the DCI is transmitted. The determining of whether to apply the start symbol value based on the reference point may be performed only for DCI format 1_2. The determining of the start symbol of the PDSCH may include applying the start symbol value based on the start of the slot allocated for the PDSCH when the subcarrier spacing of the cell is less than the subcarrier spacing of the scheduling cell. The operations may include not receiving information indicating application of the reference point when the subcarrier spacing of the cell is less than the subcarrier spacing of the scheduling cell.

A UE may perform operations according to some implementations of the present disclosure for DCI reception. The UE may include at least one transceiver, at least one processor, and at least one computer memory operably connectable to the at least one processor and storing instructions that, when executed, cause the at least one processor to perform operations according to some implementations of the present disclosure. A processing apparatus for the UE may include at least one processor and at least one computer memory operably connectable to the at least one processor and storing instructions that, when executed, cause the at least one processor to perform operations according to some implementations of the present disclosure. A computer-readable storage medium may store at least one computer program including instructions that, when executed by at least one processor, cause the at least one processor to perform operations according to some implementations of the present disclosure. Referring to FIG. 17, in some implementations of the present disclosure, the operations may include, for example, determining whether to apply a reference point other than the start of a slot allocated for a PDSCH to a cell based on a subcarrier spacing of the cell and a subcarrier spacing of a scheduling cell for the cell (S1701). The operations may include applying a start symbol value derived from symbol information in DCI that schedules the PDSCH based on the reference point or the start of the slot allocated for the PDSCH based on the determination (S1703). For example, the operations may include determining that the start symbol value is relative to a reference symbol rather than the start of the slot allocated for the PDSCH when the subcarrier spacing of the cell is equal to the subcarrier spacing of the scheduling cell. As another example, the operations may include determining that the start symbol value is a value relative to the start of the slot allocated for the PDSCH when the subcarrier spacing of the cell is less than the subcarrier spacing of the scheduling cell. The determining of the starting symbol value based on the reference point may include determining the starting symbol value for the PDSCH based on the reference point when the subcarrier spacing of the is equal to the subcarrier spacing of the scheduling cell. The determining of the start symbol value based on the reference point may include transmitting information indicating application of the reference point when the subcarrier interval of the cell is equal to the subcarrier interval of the scheduling cell. The reference point may be the start of a physical uplink control channel (PDCCH) monitoring occasion in which the DCI is transmitted. The determining of whether to determine the start symbol value based on the reference point may be performed only for DCI format 1_2. The symbol information may be time domain resource allocation information regarding a slot and length indicator value (SLIV) representing a start symbol and the number of symbols. The determining of the start symbol value based on the reference point may include determining the start symbol value for the PDSCH based on the start of the slot allocated for the PDSCH when the subcarrier spacing of the cell is less than the subcarrier spacing of the scheduling cell. The operations may include not transmitting information indicating application of the reference point when the subcarrier spacing of the cell is less than the subcarrier spacing of the scheduling cell. The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:

1. A method for transmitting downlink control information (DCI) by a base station in a wireless communication system, the method comprising:
    based on a subcarrier spacing of a cell and a subcarrier spacing of a scheduling cell for the cell, determining whether to determine a start symbol value representing a start symbol of a physical downlink shared channel (PDSCH) of the cell based on a reference point different from a start of a slot allocated for the PDSCH; and
    transmitting the DCI including symbol information regarding the start symbol value for the PDSCH through the scheduling cell based on the determination.

2. The method of claim 1, wherein determining the starting symbol value based on the reference point comprises:
    determining the start symbol value for the PDSCH based on the reference point, based on the subcarrier spacing of the cell being equal to the subcarrier spacing of the scheduling cell.

3. The method of claim 1, wherein determining the starting symbol value based on the reference point comprises:
    transmitting information notifying that the reference point is applied, based on the subcarrier spacing of the cell being equal to the subcarrier spacing of the scheduling cell.

4. The method of claim 1, wherein the reference point is a start of a physical uplink control channel (PDCCH) monitoring occasion in which the DCI is transmitted.

5. The method of claim 1, wherein determining whether to determine the start symbol value based on the reference point is performed only for DCI format 1_2.

6. The method of claim 1, wherein the symbol information is time domain resource allocation information regarding a slot and length indicator value (SLIV) representing a start symbol and a number of symbols.

7. The method of claim 1, wherein determining the starting symbol value based on the reference point comprises:
    determining the start symbol value for the PDSCH based on the start of the slot allocated for the PDSCH, based on the subcarrier spacing of the cell being smaller than the subcarrier spacing of the scheduling cell.

8. The method of claim 7, comprising:
    not transmitting the information notifying that the reference point is applied, based on the subcarrier spacing of the cell being smaller than the subcarrier spacing of the scheduling cell.

9. A method for receiving downlink control information (DCI) by a UE in a wireless communication system, the method comprising:
    receiving the DCI including symbol information on a start symbol value representing a start symbol of a physical downlink shared channel (PDSCH) of a cell on a scheduling cell for the cell;
    determining whether to apply the start symbol value based on a reference point different from a start of a slot allocated for the PDSCH based on a subcarrier spacing of the cell and a subcarrier spacing of the scheduling cell; and
    determining the start symbol of the PDSCH based on the determination and the start symbol value.

10. The method of claim 9, wherein determining whether to apply the start symbol value based on the reference point comprises:
    applying the symbol information based on the reference point, based on the subcarrier spacing of the cell being equal to the subcarrier spacing of the scheduling cell.

11. The method of claim 9, wherein determining whether to apply the start symbol value based on the reference point further comprises:
    receiving information notifying that the reference point is applied, based on the subcarrier spacing of the cell being equal to the subcarrier spacing of the scheduling cell.

12. The method of claim 9, wherein the reference point is a start of a physical uplink control channel (PDCCH) monitoring occasion in which the DCI is transmitted.

13. The method of claim 9, wherein determining whether to apply the start symbol value based on the reference point is performed only for DCI format 1_2.

14. The method of claim 9, wherein determining the start symbol of the PDSCH comprises:
    applying the start symbol value based on the start of the slot allocated for the PDSCH, based on the subcarrier spacing of the cell being smaller than the subcarrier spacing of the scheduling cell.

15. The method of claim 14, comprising:
    not receiving the information notifying that the reference point is applied, based on the subcarrier spacing of the cell being smaller than the subcarrier spacing of the scheduling cell.

16. A base station for transmitting downlink control information (DCI) in a wireless communication system, the base station comprising:
    at least one transceiver;
    at least one processor; and
    at least one computer memory operably connectable to the at least one processor and storing instructions that, when executed, cause the at least one processor to perform operations, the operations comprising:
    based on a subcarrier spacing of a cell and a subcarrier spacing of a scheduling cell for the cell, determining whether to determine a start symbol value representing a start symbol of a physical downlink shared channel (PDSCH) of the cell based on a reference point different from a start of a slot allocated for the PDSCH; and
    transmitting the DCI including symbol information regarding the start symbol value for the PDSCH through the scheduling cell based on the determination.

17. A user equipment for receiving downlink control information (DCI) in a wireless communication system, the user equipment comprising:
    at least one transceiver;
    at least one processor; and
    at least one computer memory operably connectable to the at least one processor and storing instructions that, when executed, cause the at least one processor to perform operations, the operations comprising:
    receiving the DCI including symbol information regarding a start symbol value representing a start symbol of a physical downlink shared channel (PDSCH) of a cell on a scheduling cell for the cell;

determining whether to apply the start symbol value based on a reference point different from a start of a slot allocated for the PDSCH based on a subcarrier spacing of the cell and a subcarrier spacing of the scheduling cell; and determining the start symbol of the PDSCH based on the determination and the start symbol value.

* * * * *